United States Patent
Kamijima et al.

(10) Patent No.: US 7,710,593 B2
(45) Date of Patent: May 4, 2010

(54) METHOD AND APPARATUS FOR CONTROLLING A NETWORK DEVICE USING XML AND CONDITIONAL PROCESSING

(75) Inventors: Kyoichi Kamijima, Nagano (JP); Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1057 days.

(21) Appl. No.: 11/201,138

(22) Filed: Aug. 11, 2005

(65) Prior Publication Data
US 2006/0033954 A1    Feb. 16, 2006

(30) Foreign Application Priority Data
Aug. 11, 2004    (JP) .................... P2004-234489

(51) Int. Cl.
*G06F 3/12* (2006.01)
*B41F 1/54* (2006.01)
*B41L 5/12* (2006.01)

(52) U.S. Cl. .................. 358/1.18; 358/1.1; 358/1.15; 101/484; 707/100

(58) Field of Classification Search .............. 358/1.1, 358/1.13–1.16; 707/1, 10, 100, 200; 717/114, 717/175, 174
See application file for complete search history.

(56) References Cited

U.S. PATENT DOCUMENTS

| | | | | |
|---|---|---|---|---|
| 5,917,931 | A * | 6/1999 | Kunkler ...................... | 382/137 |
| 6,540,142 | B1 * | 4/2003 | Alleshouse ............ | 235/462.01 |
| 6,643,665 | B2 * | 11/2003 | Kimbell et al. .......... | 707/104.1 |
| 6,655,593 | B2 * | 12/2003 | Alleshouse ............ | 235/462.01 |
| 6,704,120 | B1 * | 3/2004 | Leone, III et al. .......... | 358/1.18 |
| 7,287,018 | B2 * | 10/2007 | Lennon ...................... | 707/101 |
| 7,321,435 | B2 * | 1/2008 | Cherry et al. .............. | 358/1.14 |
| 7,509,305 | B2 | 3/2009 | Tozawa et al. | |
| 7,526,504 | B2 * | 4/2009 | Sedky et al. .................. | 358/1.1 |
| 2002/0007367 | A1 * | 1/2002 | Narahara .................... | 707/500 |

(Continued)

FOREIGN PATENT DOCUMENTS

JP    11-203226 A    7/1999

(Continued)

OTHER PUBLICATIONS

Harold, Elliotte, Extracts from XML Bible, 1999, available from <www.di.uminho.pt/~jcr/XML/didac/monografias/XMLBible.pdf>, accessed Feb. 2, 2009.*

(Continued)

*Primary Examiner*—Kimberly A Williams
(74) *Attorney, Agent, or Firm*—Sughrue Mion, PLLC

(57) ABSTRACT

A network device is provided with a storage and adapted to be connected to a network. A document acquirer is operable to acquire a structured document in which a rule of processing executed by the network device is described by at least one first element defining at least one condition and at least one second element defining at least one content of the processing. A document analyzer is operable to analyze the structured document to obtain an analysis result and to store the analysis result in the storage. An operation controller is operable to control an operation of the network device in accordance with the analysis result stored in the storage.

16 Claims, 16 Drawing Sheets

U.S. PATENT DOCUMENTS

| | | | |
|---|---|---|---|
| 2002/0111963 A1* | 8/2002 | Gebert et al. | 707/513 |
| 2002/0161801 A1* | 10/2002 | Hind et al. | 707/513 |
| 2002/0161831 A1* | 10/2002 | Nakaoka et al. | 709/203 |
| 2003/0107761 A1* | 6/2003 | Kimura | 358/1.15 |
| 2003/0140809 A1* | 7/2003 | Krautter | 101/484 |
| 2003/0202199 A1* | 10/2003 | Carter et al. | 358/1.13 |
| 2004/0049738 A1* | 3/2004 | Thompson et al. | 715/513 |
| 2004/0128555 A1 | 7/2004 | Saitoh et al. | |
| 2004/0167749 A1* | 8/2004 | Friedman et al. | 702/186 |
| 2005/0030580 A1* | 2/2005 | Moroi | 358/1.15 |
| 2005/0094182 A1* | 5/2005 | Reese et al. | 358/1.14 |
| 2005/0134896 A1* | 6/2005 | Koga | 358/1.14 |
| 2006/0155725 A1* | 7/2006 | Foster et al. | 707/100 |
| 2007/0005736 A1* | 1/2007 | Hansen et al. | 709/220 |

FOREIGN PATENT DOCUMENTS

| | | |
|---|---|---|
| JP | 2002-312208 A | 10/2002 |
| JP | 2004-126933 A | 4/2004 |
| JP | 2004-145490 A | 5/2004 |
| JP | 2004-166241 A | 6/2004 |

OTHER PUBLICATIONS

W3C Extensible Markup Language (XML) 1.0 (Third Edition), Feb. 4, 2004, available from <http://www.w3.org/TR/2004/REC-xml-20040204>, accessed Feb. 2, 2009. [Not attached].*

* cited by examiner

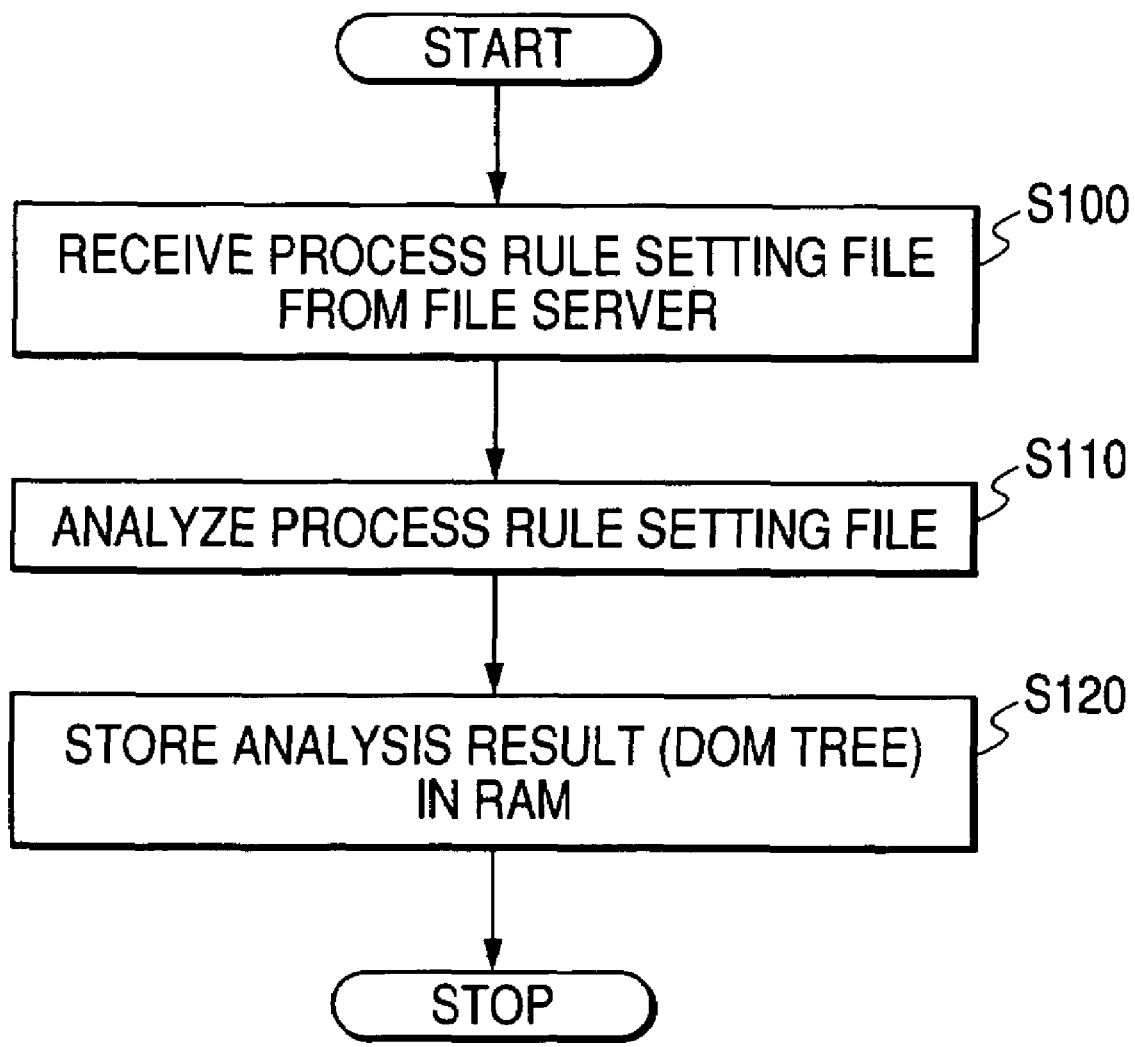

<PROCESS RULE>
    <CONDITIONAL PROCESSING,
    CONDITIONAL EXPRESSION = "DeviceSeg = ClientSeg">
        <CONDITIONAL PROCESSING,
        CONDITIONAL EXPRESSION = "UserName = "A,B,C,D"">
            <PRINT DATA>
                <OPERATION> INSERTION </OPERATION>
                <LOCATION> HEAD </LOCATION>
                <DATA> @ESC"c" </DATA>
            </PRINT DATA>
        </CONDITIONAL PROCESSING>
        <CONDITIONAL PROCESSING,
        CONDITIONAL EXPRESSION = "UserName! = "A,B,C,D"">
            <PRINT DATA>
                <OPERATION> INSERTION </OPERATION>
                <LOCATION> HEAD </LOCATION>
                <DATA> @ESC"m" </DATA>
            </PRINT DATA>
        </CONDITIONAL PROCESSING>
    </CONDITIONAL PROCESSING>
    <CONDITIONAL PROCESSING,
    CONDITIONAL EXPRESSION = "DeviceSeg! = ClientSeg">
        <ERROR> e001 </ERROR>
    </CONDITIONAL PROCESSING>
</PROCESS RULE>

```
<PROCESS RULE>
    <DATA TRANSFER DESTINATION>
        ¥¥ServerA¥Other¥
    </DATA TRANSFER DESTINATION>
    <CONDITIONAL PROCESSING,
     CONDITIONAL EXPRESSION = "HeadOCR = "ESTIMATE"">
        <DATA TRANSFER DESTINATION>
            ¥¥ServerA¥ESTIMATE¥
        </DATA TRANSFER DESTINATION>
    </CONDITIONAL PROCESSING>
    <CONDITIONAL PROCESSING,
     CONDITIONAL EXPRESSION = "HeadOCR = "INVOICE"">
        <DATA TRANSFER DESTINATION>
            ¥¥ServerA¥INVOICE¥
        </DATA TRANSFER DESTINATION>
    </CONDITIONAL PROCESSING>
</PROCESS RULE>
```

*FIG. 13*

```
⋮
<PROCESS RULE>
    <CONDITIONAL PROCESSING,
      CONDITIONAL EXPRESSION = "DeviceSeg = ClientSeg">
        <BACKGROUND DATA>
            <OPERATION> INSERTION </OPERATION>
            <LOCATION> LOWER RIGHT </LOCATION>
            <DATA> @LogonUserName </DATA>
        </BACKGROUND DATA>
    </CONDITIONAL PROCESSING>
    <CONDITIONAL PROCESSING,
      CONDITIONAL EXPRESSION = "DeviceSeg ≠ ClientSeg">
        <ERROR> e001 </ERROR>
    </CONDITIONAL PROCESSING>
</PROCESS RULE>
⋮
```

METHOD AND APPARATUS FOR CONTROLLING A NETWORK DEVICE USING XML AND CONDITIONAL PROCESSING

BACKGROUND OF THE INVENTION

The present invention relates to a network device which is connectable to a network, and a method for controlling the network device.

Japanese Patent Publication No. 2004-145490A discloses a network device which uses a layout based on preset format setting information when outputting internal information, such as various settings, by way of a communication device such as a facsimile. This device enables alteration of the layout used for outputting the internal information by changing the format setting information.

However, the above-described communication device enables relatively easy alteration of the layout used at the time of output of internal information, but does not cope with customization of specifics of other processing. A conceivable technique for realizing customization of specifics of processing is a technique for setting parameters used for controlling specifics of processing by way of an exclusive screen. In this case, there is a tendency for limiting specifics of processing which can be customized, because of limitations imposed on the screen layout.

SUMMARY OF THE INVENTION

It is therefore an object of the invention to provide a network device and a method for controlling the same, in which customization of specifics of processing of the network device is facilitated in a flexible manner.

In order to achieve the above object, according to the invention, there is provided a network device adapted to be connected to a network, comprising:

a storage;

a document acquirer, operable to acquire a structured document in which a rule of processing executed by the network device is described by at least one first element defining at least one condition and at least one second element defining at least one content of the processing;

a document analyzer, operable to analyze the structured document to obtain an analysis result and to store the analysis result in the storage; and an operation controller, operable to control an operation of the network device in accordance with the analysis result stored in the storage.

With this configuration, the operation of the network device is controlled so as to comply with the rule described in the structured document. Consequently, the user can readily customize specifics of processing of the network device by preparing a structured document in which a desired rule is described. Moreover, the rule is defined through use of the first element pertaining to the condition and the second element pertaining to the content of processing. In comparison with a case where a rule is set through use of an exclusive screen, specifics of processing can be customized more flexibly.

Preferably, the structured document is described with a markup language such as XML (eXtensible Markup Language).

Preferably, the first element and the second element are described with a tree structure; and the operation controller controls the operation so as to execute processing defined by one of the at least one second element which satisfies one of the at least one condition which is closer to a root of the tree structure.

Preferably, the operation controller controls the operation so as to execute the processing in accordance with an order defined by a description order in the structured document.

In these cases, complex conditions and/or processing order can be defined.

Preferably, the document acquirer acquires the structured document from a computer connected to the network.

In this case, the structure document can be shared among a plurality of network devices. Here, a timing that the document acquirer may be set arbitrary (e.g., the activation of the network device, two o'clock every day).

Preferably, the network device is configured to be operated in accordance with a command issued from a client terminal connected to the network; and the at least one condition includes a condition which is established when an identifier for the client terminal matches with a prescribed identifier. Here, it is preferable that the identifier is a network identifier.

In this case, the rule of processing can be defined through the use of the identifier of the client terminal. The identifier includes a computer name, an IP address, and a MAC (Media Access Control) address, a log-in username or the like.

Preferably, the at least one content of processing includes processing for disabling the operation such as error processing.

Preferably, the network device is a print server operable to cause at least one printer communicatively connected to the print server to execute printing of print data which is received from a client terminal connected to the network.

Here, it is preferable that the at least one content of processing includes processing for updating (addition, deletion, correction or the like) a code contained in the print data for controlling the at least one printer.

Preferably, the network device is an image scanner operable to scan an original to generate image data corresponding to the original.

Here, it is preferable that: the at least one condition includes a condition which is established when a prescribed character is recognized in a prescribed region in the original; and the at least one content of processing includes processing for storing the image data in a prescribed location in the network.

Preferably, the network device is a projector operable to project an image in accordance with a command issued from a client terminal connected to the network.

Here, it is preferable that the at least one content of processing includes processing for insert an identifier for the client terminal in a prescribed location of a background of the image. The identifier includes a computer name, an IP address, and a MAC address, a log-in username or the like.

According to the invention, there is also provided a method of controlling a network device provided with a storage and adapted to be connected to a network, comprising:

acquiring a structured document in which a rule of processing executed by the, network device is described by at least one first element defining at least one condition and at least one second element defining at least one content of the processing;

analyzing the structured document to obtain an analysis result and to store the analysis result in the storage; and controlling an operation of the network device in accordance with the analysis result stored in the storage.

According to the invention, there is also provided a computer-readable medium containing a program causing a computer to execute the above method.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a flow chart showing a processing for receiving a process rule setting file which is performed by the print server;

FIG. 3 shows a description example of the process rule setting file used in the first embodiment;

FIG. 8 shows a description example of the process rule setting file used in the second embodiment;

FIG. 13 shows a description example of the process rule setting file used in the third embodiment;

DETAILED DESCRIPTION OF THE EMBODIMENTS

Embodiments of the invention will be described below in detail with reference to the accompanying drawings.

Figure 1:
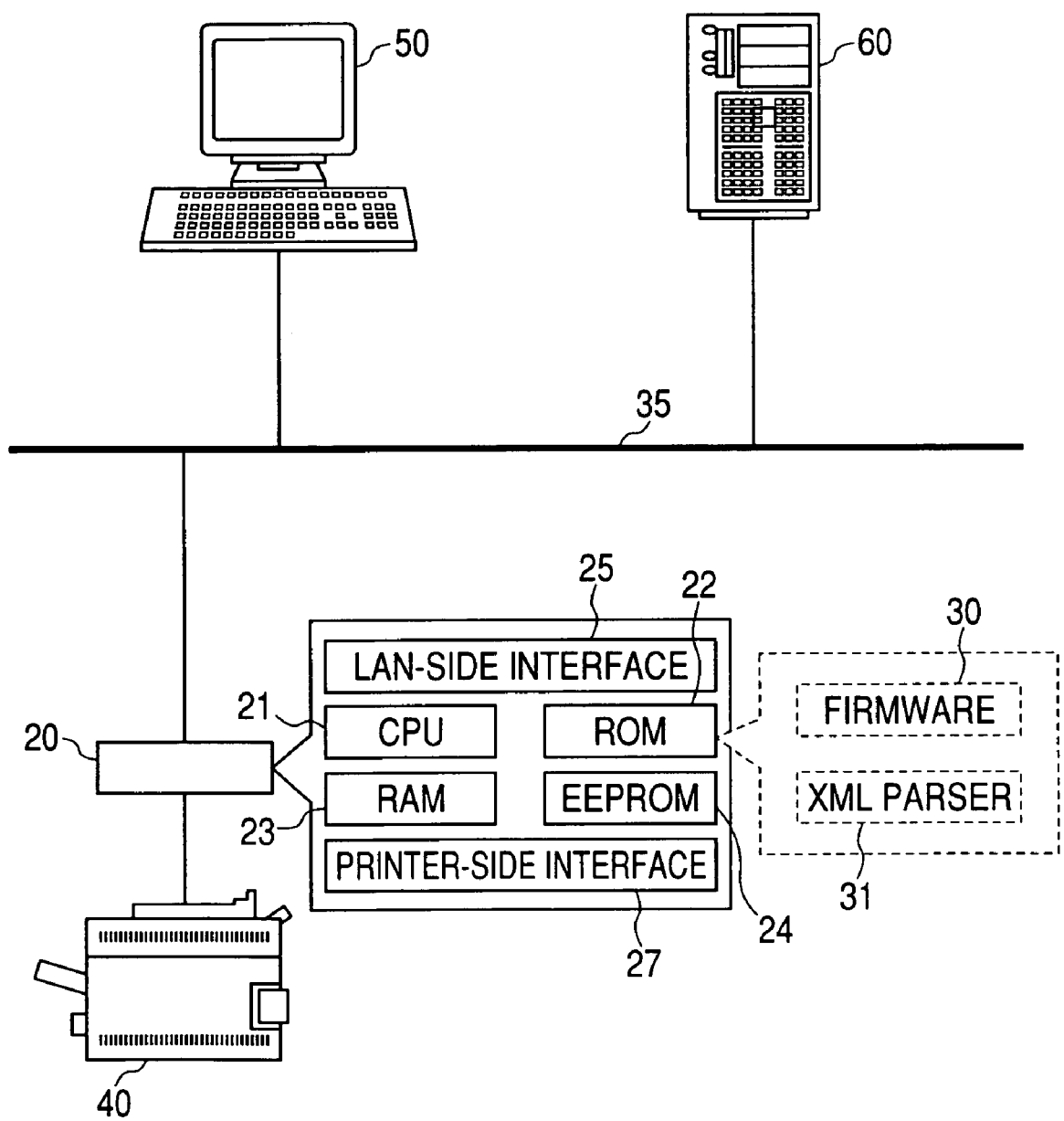
FIG. 1 is a diagram showing a system configuration including a print server according to a first embodiment of the invention.

FIG. 1 shows a system configuration including a print server 20 which serves as a network device according to a first embodiment of the invention. As illustrated, the print server 20 comprises a CPU 21 for controlling the entire device; a ROM 22 for storing various types of programs; a RAM 23 for temporarily storing data; and an EEPROM 24 for storing data in a nonvolatile manner. The print server 20 is connected to a LAN 35 by way of a LAN-side interface 25, as well as to a printer 40 by way of a printer-side interface 27.

The print server acts as an exclusive print server machine which spools the print data transmitted from a client terminal 50, or the like, onto the RAM 23, and then transfers the thus-spooled data to the printer 40. Firmware 30 used for controlling operation of the entire device, an XML (eXtensible Markup Language) parser 31 which analyzes an XML document, and the like, are stored in the ROM 22 of the print server 20. The LAN 35 is connected to a file server 60 serving as a general-purpose computer, and information stored in an unillustrated hard disk drive of the file server 60 can be shared by way of the LAN 35.

Operation of the thus-configured print server 20 will now be described. Particularly, operation performed at the time of customization of specifics of processing of the print server 20 will be described. FIG. 2 shows a flowchart showing an example of processing for receiving a process rule setting file to be performed by the CPU 21 of the print server 20 through use of the firmware 30, the XML parser 31, and the like. This processing is performed at predetermined timing (e.g., a timing at which the print server 20 is activated, at two o'clock every day, or the like).

As illustrated, during the processing, a process rule setting file in which a process rule of the print server 20 is set is downloaded from the file server 60, and then executed (step S100). Here, information about a location where the process rule setting file is to be stored (e.g., the name of a computer, a folder name, a file name, or the like) is assumed to have been stored in the EEPROM 24 in advance. FIG. 3 is a descriptive view showing an example description of the process rule setting file. As illustrated, the process rule setting file is an XML document described through use of XML, which is employed as a markup language. The process rule setting file is formed while an "element" sandwiched between a pair of tags consisting of a start tag and an end tag is taken as a basic unit. "Character string data" or other elements are described between the start tag and the end tag, as specifics of the element, whereby the respective elements, the character string data, and the like, are given a hierarchical structure. An "attribute," which serves as supplemental information to be added to the element, is to be described in the start tag. In the process rule setting file, the process rule of the print serve 20 is described through use of the "elements," the "character string data," and the "attribute" in the XML document. Specific descriptions of the process rule will be described later.

The XML document has an XML declaration for describing the version of XML, and a DTD (Document Type Definition) used for describing rules of tags used in an XML document. However, they do not form the heart of the present invention, and hence their further detailed explanations are omitted.

Figure 4:
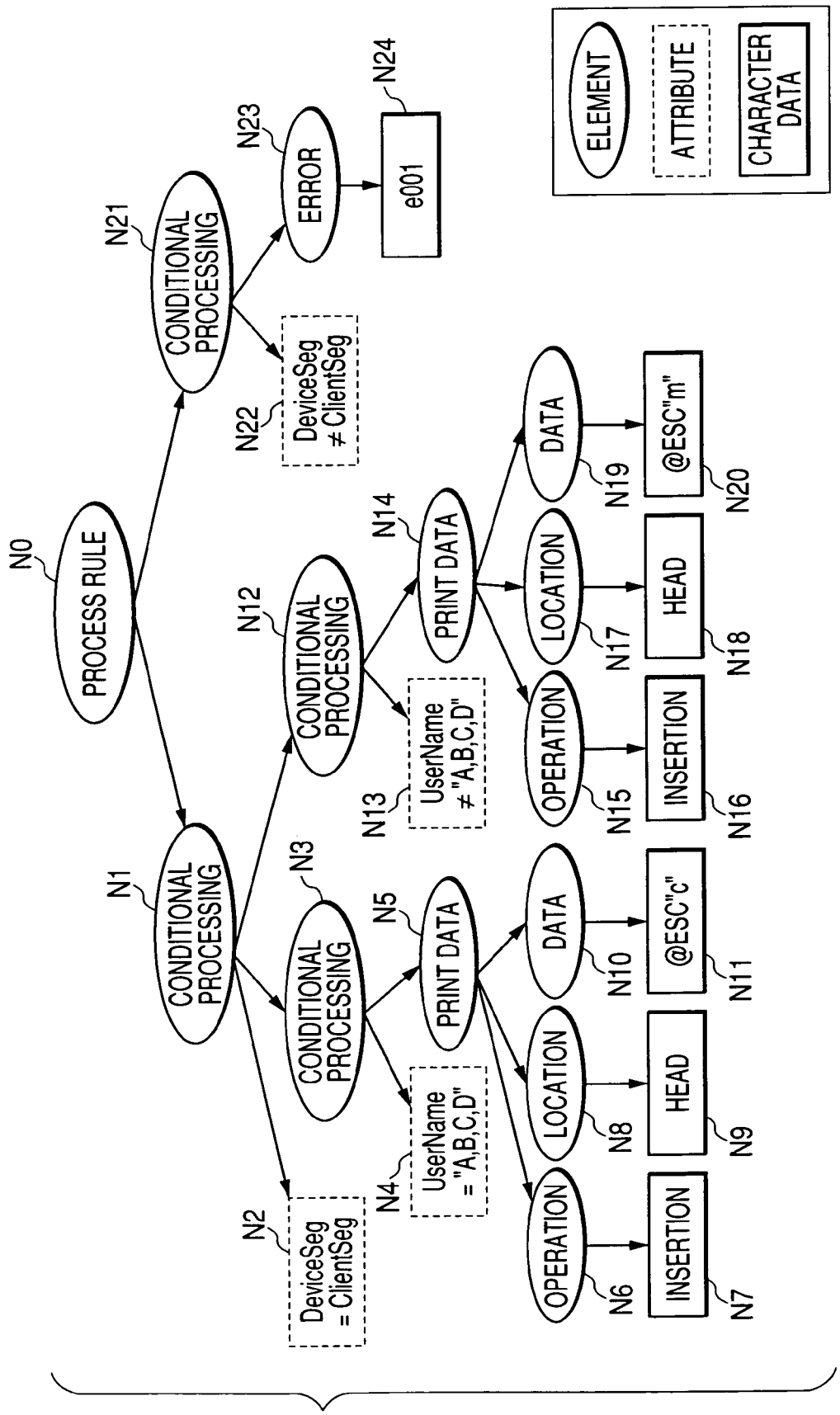
FIG. 4 is a diagram showing a DOM tree used in the first embodiment.

The downloaded process rule setting file is analyzed through use of the XML parser 31, and the result of analysis is stored in the RAM 23 (steps S110, S120). Thus, processing is terminated. In the first embodiment, a DOM (Document Object Model) is adopted as an API (Application Program Interface) of the XML parser 31, and a result of analysis is assumed to be stored in the RAM 23 as a DOM tree. FIG. 4 is a descriptive view conceptually showing a DOM tree which is a result of analysis of the process rule setting file illustrated in FIG. 3. As illustrated, the DOM tree assumes a tree structure taking, as nodes, the elements, the character string data, the attributes, and the like. On the assumption that a certain element is taken as a parent node, the attribute of the element, character string data serving as specifics of the element, and another element are arranged as child nodes. When a plurality of child nodes are present, the attribute of a certain element which is a parent node is arranged as the leftmost child node. In accordance with a description sequence in the XML document, character string data and another element are arranged as right child nodes.

Figure 5:
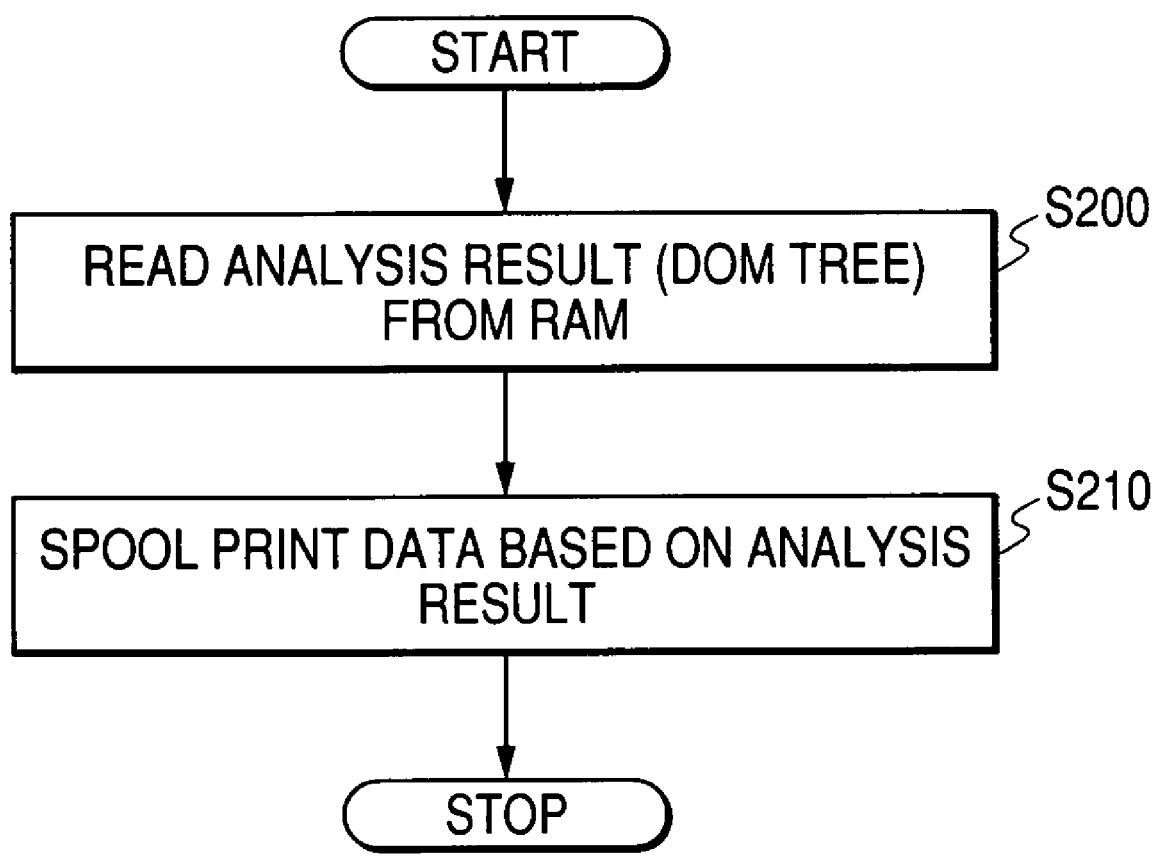
FIG. 5 is a flow chart showing a processing for receiving print data which is performed by the print server.

Next, operation of the print server 20 based on the result of analysis of the process rule setting file will be described. FIG. 5 is a descriptive view showing an example of print data receipt processing to be performed by the CPU 21 of the print server 20 through use of the firmware 30. This processing is performed every time print data are received from the client terminal 50 or the like. In the print data receipt processing, as illustrated, the result of analysis of the process rule setting file (DOM tree) stored in the RAM 23 is read (step S200). On the basis of the thus-read analysis result, spool processing for spooling the received print data onto the RAM 23 is performed (step S210), and processing is completed. The spool processing based on the result of analysis of the process rule setting file is performed by sequentially retrieving (depth-prioritized retrieval), in a prioritized manner, and referring to child nodes on the left side in relation to the root element corresponding to the root of the read DOM tree; and executing processing specifics corresponding to the attribute and details (character string data) of the referred nodes. The spool processing based on the result of analysis of the process rule setting file will be described through use of the DOM tree shown in FIG. 4, by taking, as an example, specifics of the process rule described in the process rule setting file shown in FIG. 3.

Of the child nodes of the element "process rule" (N0), which is a root element of the DOM tree shown in FIG. 4, a left element "conditional processing" (N1) is referred to. In the print server 20, the element "conditional processing" is an element which defines a condition of the process rule, and the attribute of that element is previously defined as a conditional expression. In a specific example, attribute "DeviceSeg=ClientSeg" (N2) of the element "conditional processing" (N1) becomes a conditional expression. Here, "DeviceSeg" and "ClientSeg" are previously set as variables which can be used in the process rule. "DeviceSeg" shows a network address of the print server 20, and "ClientSeg" shows a network address of a source (the client terminal 50 or the like) of the print data.

When the conditional expression (DeviceSeg=ClientSeg) stands, an element "conditional processing" on the right of an attribute (N2) of the element "conditional processing" (N1) is referred to. As mentioned previously, the element "conditional processing" is an element defining a condition, and an attribute "UserName="A, B, C, D" (N4) of the element becomes a conditional expression. Here, "UserName" is previously defined as a variable which shows a username to be described in the header section of print data.

When a conditional expression (UserName="A, B, C, D") stands, an element "print data" (N5) on the right of the attribute (N4) is referred to. Subsequently, the leftmost element "operation" (N6) of the child nodes of the element "print data" (N7) is referred to, and character string data "insertion" (N5), which is a child node of the element (N6), is referred to. Similarly, reference is sequentially made to the element "location" (N8), character string data "head" (N9), an element "data" (N10), and character string data @ESC"c" (N11). Here, the element "print data" is previously determined as an element which determines, with respect to the print data, processing specifics used for updating a print control code in accordance with the elements "operation," "location," and contents of "data" (character string data), which are child nodes. Therefore, there is performed processing for adding the printer control code @ESC"c" to the head of the print data. The printer control code @ESC"c" is previously set as a code for controlling the printer 40 such that print data are subjected to color printing. As mentioned above, described in the nodes from (N1) to (N11) is a process rule: [the printer control code @ESC"c" is added to the head of print data (print data are subjected to color printing) when the network address of the print server 20 coincides with the network address of the source of the print data and when the username described in the header section of the print data corresponds to any one of "A, B, C, D"].

When reference is made to the nodes (N1) to (N11), reference is then made to the element "conditional processing" (N12) on the right of the element "conditional processing" (N3). When the conditional expression (UserName≠"A, B, C, D") which is an attribute (N13) stands, a reference is made to the element "print data" (N14) on the right of the attribute (N13). As in the case of the previously-described nodes (N6) to (N11), processing for adding a printer control code @ESC"m" to the head of the print data is performed by reference to nodes (N15) to (N20). The printer control code @ESC"m" is previously set as a code for controlling a printer 40 such that print data are subjected to monochrome printing. As mentioned above, described in the nodes (N1) and (N12) to (N20) is a process rule: [the printer control code @ESC"m" is added to the head of the print data (print data are subjected to monochrome printing) when the network address of the print server 20 coincides with the network address of the source of the print data and when the username described in the header of the print data does not correspond to any of "A, B, C, D"].

When reference is made to nodes (N12) to (N20) in the manner mentioned above, reference is then made to "conditional processing" (N21) on the right of the element "conditional processing" (N1). When the conditional expression (DeviceSeg≠ClientSeg), which is an attribute (N22), stands, reference is made to an element "error" (N23) on the right of the attribute (N22), and reference is then made to character string data "e001" (N24), which is a child node. Here, the element "error" is previously set as an element used for determining error processing through which contents (character string data) are determined as an error code. Consequently, error processing of the error code "e001" is performed. As mentioned above, described in nodes (N21) to (N24) is a process rule: [error processing of the error code "e001" is performed when the network address of the print server 20 differs from the network address of the source of the print data].

Figure 6:
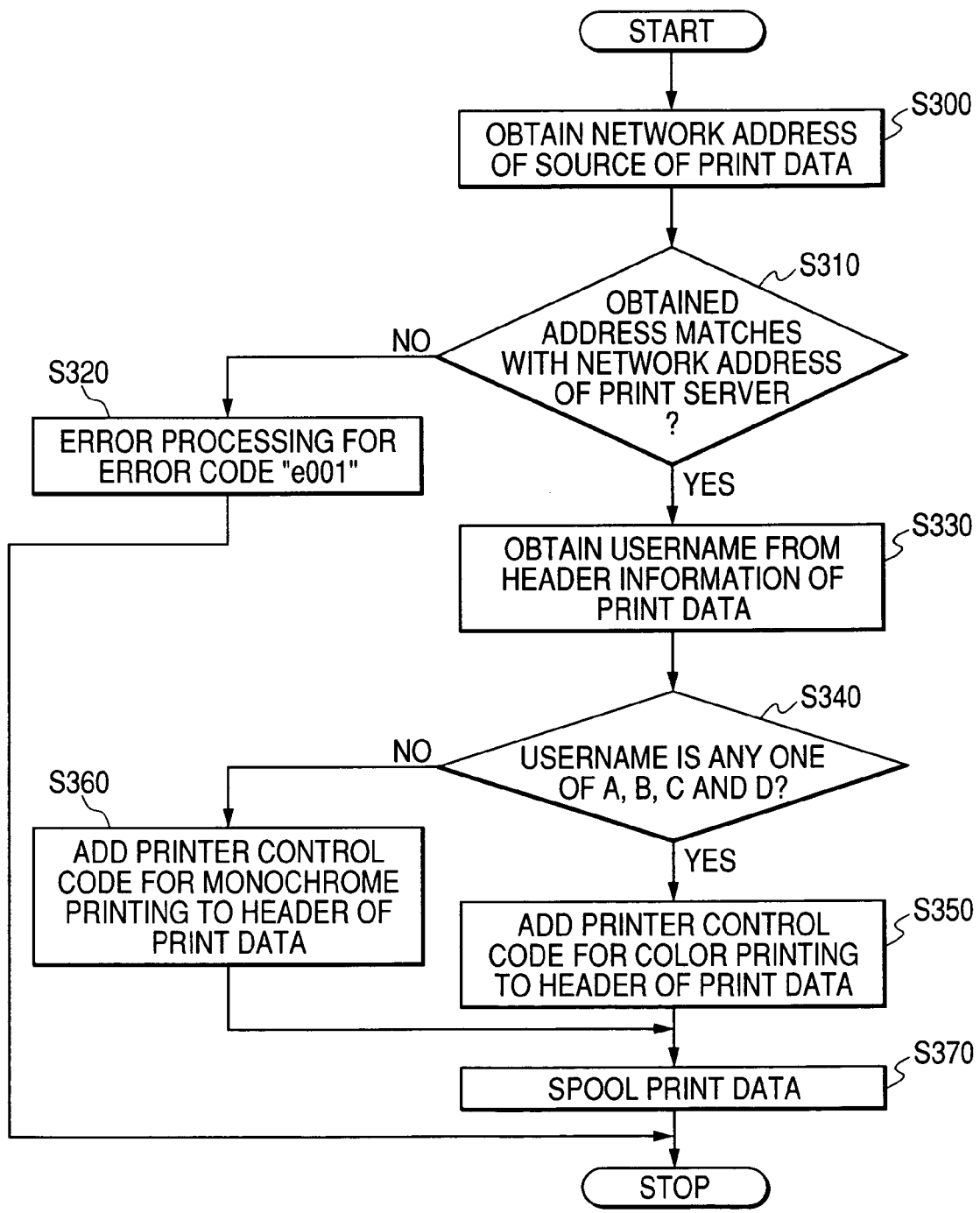
FIG. 6 is a flow chart showing a customized processing for spooling the print data.

As mentioned above, the print data are spooled onto the RAM 23 by sequentially retrieving, in a prioritized manner, child nodes on the left side in relation to the root element of the read DOM tree; and executing processing specifics corresponding to the attribute and details (character string data) of the referred nodes. FIG. 6 is a descriptive view showing, in the form of a flowchart, spool processing based on the process rule of the embodiment. Specifically, the network address of the source (a client terminal 50) of print data is acquired, and the thus-acquired network address is compared with the network address of the print server 20 (steps S300, S310). When the network addresses do not coincide with each other, error processing of the error code "e001" is performed (step S320), and processing is terminated. In contrast, when the network address of the source and the network address of the print server 20 coincide with each other, the username is acquired from the header information about print data (step S330). When this username corresponds to any one of "A, B, C, D," a printer control code @ESC"c" used for commanding color printing is added to the header section of the print data (step S350). When the username does not correspond to any of "A, B, C, D," a printer control code @ESC"m" used, for controlling monochrome printing is added to the header section of the print data (step S360). The print data are spooled onto the RAM 23 (step 5370), and spool processing of the print server 20 can be customized so as to become processing described in the flowchart shown in FIG. 6.

The thus-described print server 20 of the first embodiment downloads, from the file server 60, a process rule setting file in which a process rule is described through use of XML, and analyzes the thus-downloaded file. Further, the print server stores a result of analysis (DOM tree) in the RAM 23, and can perform spool processing on the basis of the thus-stored analysis result. Specifically, since spool processing is carried out in compliance with the process rule described in the process rule setting file, the user can readily customize specifics of processing of the print server 20 by keeping, in the file server 60, the process rule setting file in which a desired process rule is described. A process rule is set in the process rule setting file by describing an element whose condition is determined (element "conditional processing") and an element (element "print data," "error," or the like) whose processing specifics are determined. In comparison with a case where a process rule is set through use of an exclusive screen, complicate conditions or procedures for carrying out processing specifics can be set. Namely, processing specifics can be customized more flexibly.

In the print server 20 of the first embodiment, the process rule setting file is taken as an XML document described through use of XML. However, the essential requirement is to set a process rule through use of the element for setting a condition and an element for determining processing specifics. Another language may also be used.

In the print server 20 of the first embodiment, the process rule setting file is downloaded from the file server 60. However, the essential requirement is to be able to acquire a process rule setting file, and there is no necessity for downloading the process rule setting file from a computer, such as the file server 60, connected to the LAN 35. Although the result of analysis of a process rule setting file is stored in the RAM 23, any location may be employed for storage. For instance, the analysis result may be stored in the EEPROM 24. Moreover, the process rule setting file may be stored in the RAM 23 or the EEPROM 24. When print data are subjected to receipt processing, the process rule setting file may be analyzed and used.

Although the print server 20 of the first embodiment stores the result of analysis of the process rule setting file in the form of a DOM tree, the result may be stored in a format other than the DOM tree, so long as the firmware 30 of the print server 20 can interpret the process rule.

Although the print server 20 of the first embodiment is described as performing processing based on the result of analysis of the process rule setting file through the spool processing for spooling print data on the RAM 23, processing based on the result of analysis of the process rule setting file may also be performed when processing other than spool processing is performed, so long as processing pertains to the print server 20.

Although the print server 20 of the first embodiment illustrates, as conditions for a process rule, conditions under which the network address of the source and the network address of the print server 20 coincide with each other and conditions under which the network addresses differ from each other, network identification information (e.g., a domain name or the like) other than the network address may be used. Although conditions under which the username described in the header section of the print data correspond to any one of "A, B, C, D" and conditions under which the username does not correspond to any of "A, B, C, D" are illustrated, identification information (e.g., the name of a computer or an IP address) pertaining to the client terminal 50 other than the username may be used. As a matter of course, various other conditions may be used as conditions for the process rule.

Although in connection with the print server 20, processing for updating a printer control code for print data and error processing have been illustrated, it goes without saying that specifics of processing of another type may be used.

In connection with the print server 20 of the first embodiment, the process rule setting file shown in FIG. 3 has been described as a specific embodiment. However, it goes without saying that designations and meanings of the elements are not limited to the specific embodiment. For instance, an element other than the element "conditional processing" may be used as an element for defining conditions.

In the first embodiment, the network device of the present invention, which operates on the basis of the result of analysis of the process rule setting file, has been described as the print server 20. However, the present invention may be taken as a mode of a method for controlling such a network device.

Figure 7:
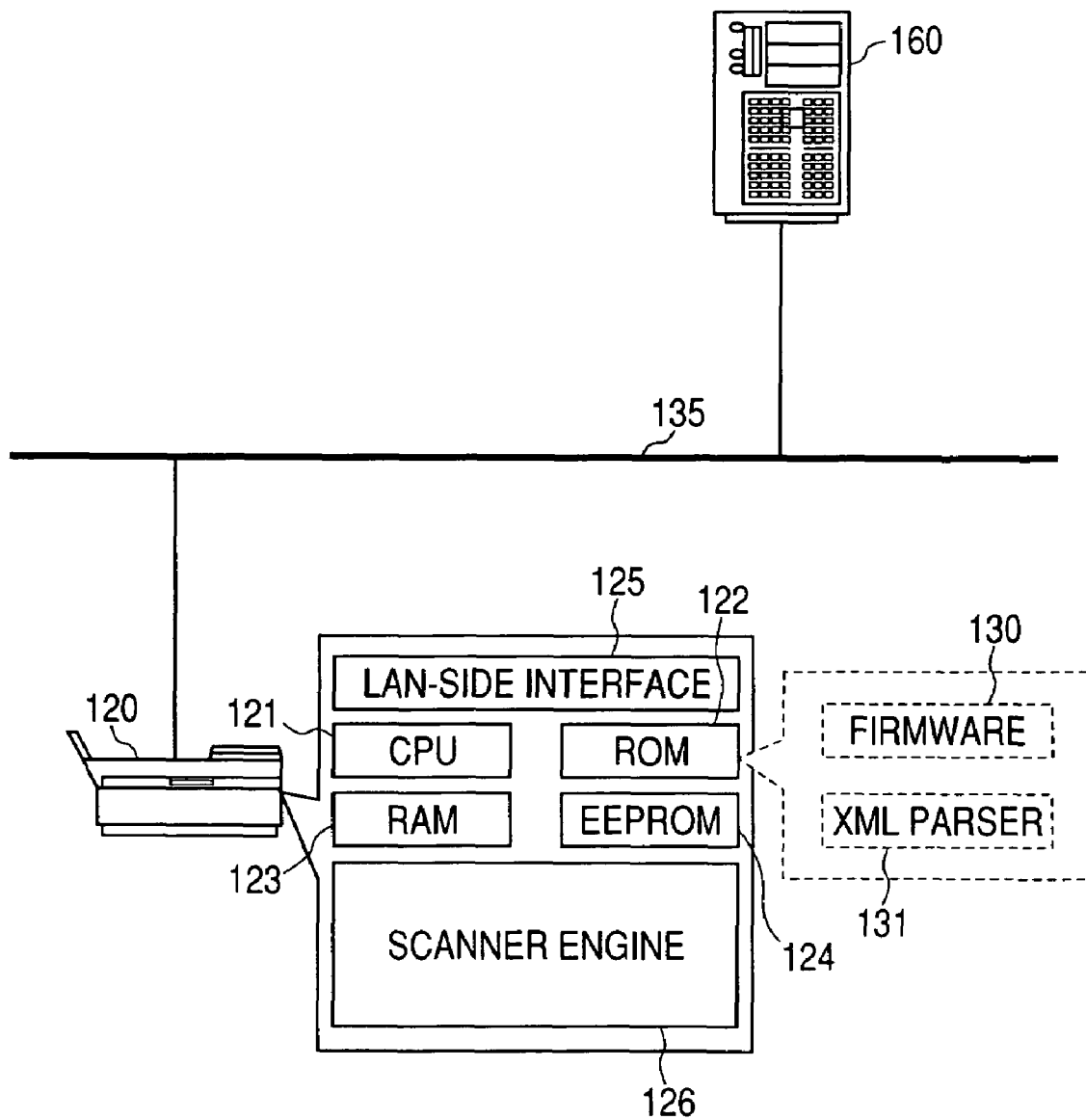
FIG. 7 is a diagram showing a system configuration including an image scanner according to a second embodiment of the invention.

FIG. 7 is a diagram showing a system configuration including an image scanner 120 which serves as a network device according to a second embodiment of the invention. The image scanner 120 comprises a CPU 121 for controlling the entire device; a ROM 122 for storing various types of programs; a RAM 123 for temporarily storing data; an EEPOM 124 for storing data in a nonvolatile manner; and a scanner engine 126 for implementing a scanner function. The image scanner 120 is connected to a LAN 135 by way of a LAN-side interface 125, and acts as an image scanner for acquiring image data by scanning a document set on the scanner. Firmware 130 used for controlling operation of the entire device and an XML parser 131 which analyzes an XML document are stored in the ROM 122 of the image scanner 120. The LAN 135 is connected to a file server 160 serving as a general-purpose computer, and information stored in an unillustrated hard disk drive of the file server 160 can be shared by way of the LAN 135.

Figure 9:
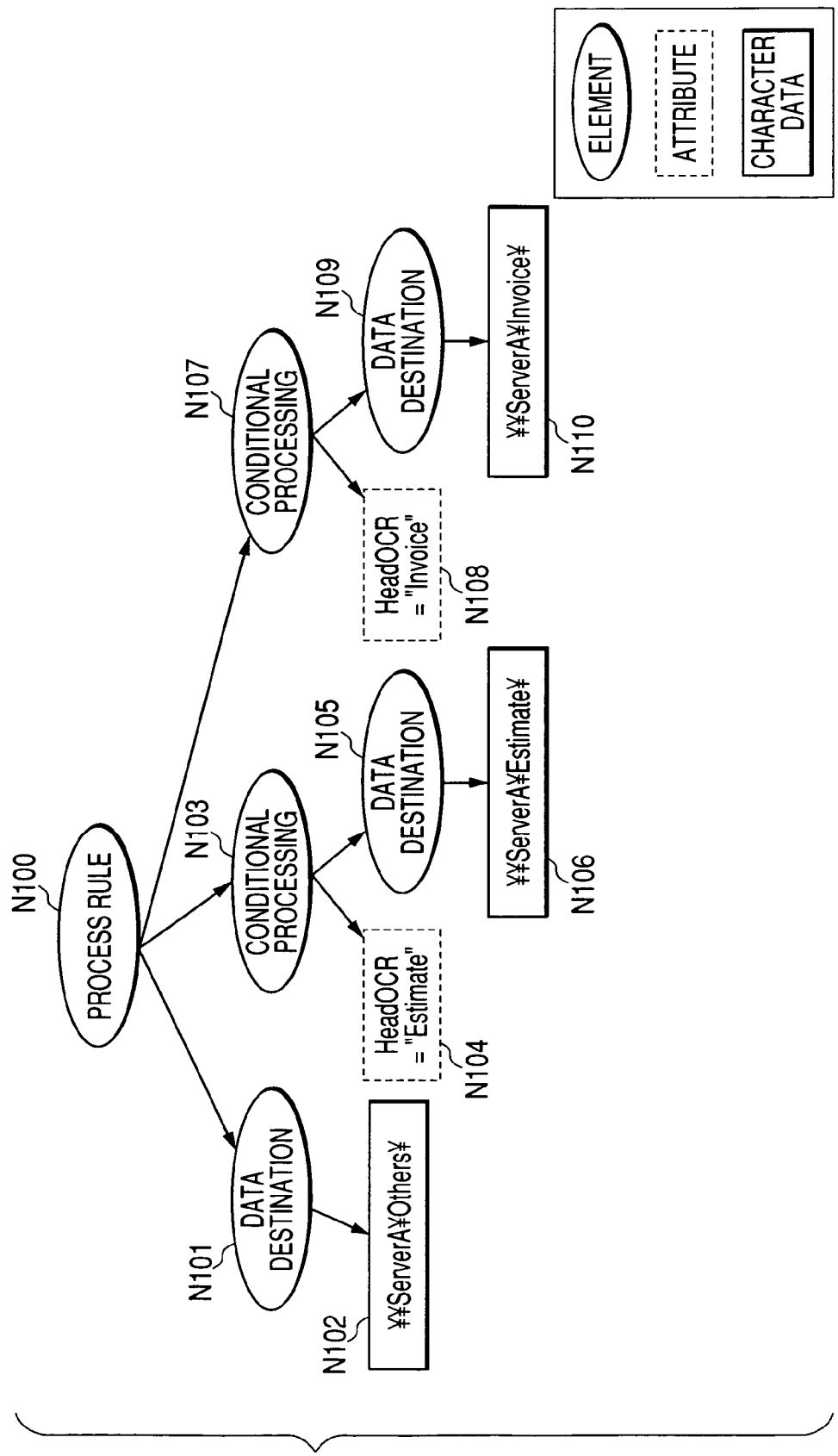
FIG. 9 is a diagram showing a DOM tree used in the second embodiment.

Operation of the thus-configured image scanner 120 will now be described. Particularly, operation performed at the time of customization of specifics of processing of the image scanner 120 will be described. As in the case of the print server 20 of the first embodiment, the image scanner 120 of the second embodiment performs, at a predetermined timing, the process rule setting file receipt processing illustrated in FIG. 2. A process rule setting file in which a process rule of the image scanner 120 is set is downloaded from the file server 160 (step S100), and the thus-downloaded process rule setting file is analyzed through use of the XML parser 131 and stored in the RAM 123 (steps S110, S120). FIG. 8 is a descriptive view showing an example of the process rule setting file of the second embodiment, and FIG. 9 is a descriptive view conceptually showing a DOM tree obtained as a result of analysis of the process rule setting file shown in FIG. 8. As in the case of the first embodiment, the process rule setting file is an XML document described through use of XML, which is employed as a markup language. The process rule of the print server 120 is described through use of the "elements," the "character string data," and the "attribute" in the XML document. Specific details of the process rule will be described later.

Figure 10:
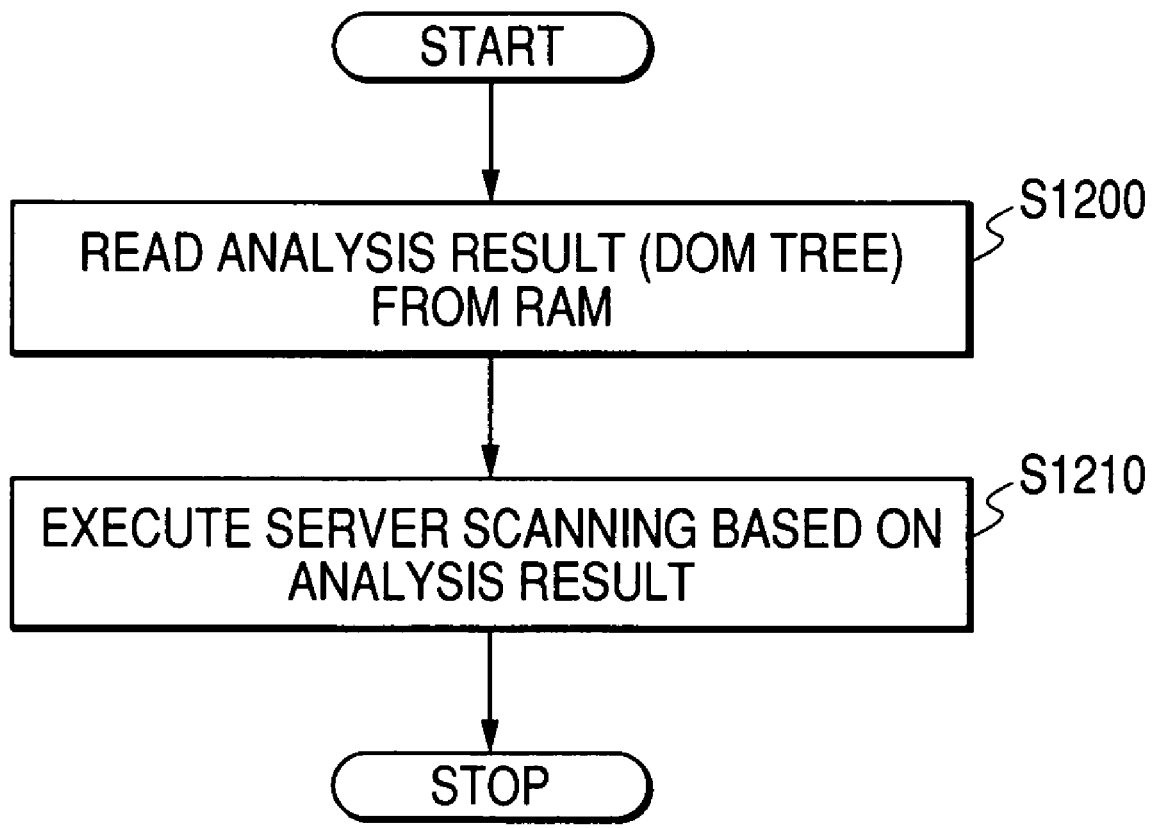
FIG. 10 is a flow chart showing a processing for executing a server scanning which is performed by the image scanner.

Next, operation of the image scanner 120 based on the result of analysis of the process rule setting file will be described. FIG. 10 is a descriptive view showing an example of server scanning to be performed by the CPU 121 of the image scanner 120 through use of the firmware 130. This processing is performed when a server scan command is issued by way of an unillustrated control panel of the image scanner 120. As illustrated, in the server scanning, the result of analysis of the process rule setting file (DOM tree) stored in the RAM 123 is read (step S1200). There is performed server scanning, wherein the set document is scanned on the basis of the thus-read analysis result to thus capture image data, and the thus-captured image data are stored in a predetermined storage location (step S1210), and processing is completed. The server scanning based on the result of analysis of the process rule setting file is performed by sequentially retrieving (depth-prioritized retrieval), in a prioritized manner, and referring to child nodes on the left side in relation to the root element corresponding to the root of the read DOM tree; and executing processing specifics corresponding to the attribute and details (character string data) of the referred nodes. The server scanning based on the result of analysis of the process rule setting file will be described through use of the DOM tree shown in FIG. 9, by taking, as an example, specifics of the process rule described in the process rule setting file shown in FIG. 8.

Of the child nodes of the element "process rule" (N100), which is a root element of the DOM tree shown in FIG. 9, reference is made to the leftmost element "data transfer destination" (N101), and reference is made to character string data ¥¥ServerA¥Others¥, which is a child node of the element "data transfer destination" (N102). The element "data transfer destination" is determined in advance as an element which determines specifics of the data (character string data) as a destination (a location) where image data acquired through server scan are transferred. Consequently, ¥¥ServerA¥Others¥ is set as a transfer destination of image data.

Reference is made to "conditional processing" (N103) on the right of the element "data transfer destination" (N101). The element "conditional processing" is an element defining conditions for a process rule, and an attribute of the element is determined as a conditional expression in advance. Here, an attribute "HeadOCR=Estimate" (N104) of the element "conditional processing" (N103) becomes a conditional expression. Here, "HeadOCR" is determined in advance as a variable which can be used in the process rule, and shows a character string which is distinguished from the image data obtained by tentatively scanning a predetermined header region of the document.

When a conditional expression (HeadOCR="Estimate") stands, reference is made to an element "data transfer destination" (N105) on the right of the attribute (N104). As mentioned previously, the element "data transfer destination" is an element which defines processing for setting specifics of the element as a destination of image data. Here, the character string data ¥¥ServerA¥Estimate¥ (N106) is set as a transfer destination of image data.

Reference is made to an element "conditional processing" (N107) on the right of the element "conditional processing" (N103). When the conditional expression (HeadOCR="Invoice"), which is an attribute (N108), stands, reference is made to an element "data transfer destination" (N109) on the right of the attribute (N108). Character string data ¥¥ServerA¥Invoice¥ (N110), which are specifics of the element "data transfer destination," are set as a transfer destination of the image data. As mentioned above, at nodes (N100) to (N110), there is described a process rule, by which: the "data transfer destination" is set in ¥¥ServerA¥Others¥; when an "estimate" is identified in the image data pertaining to the header region of the document, the data transfer destination is set (changed) to ¥¥ServerA¥Estimate¥; and, when the "invoice" is identified in the image data pertaining to the header region of the document, the data transfer destination is set (changed) to ¥¥ServerA¥Invoice¥.

Figure 11:
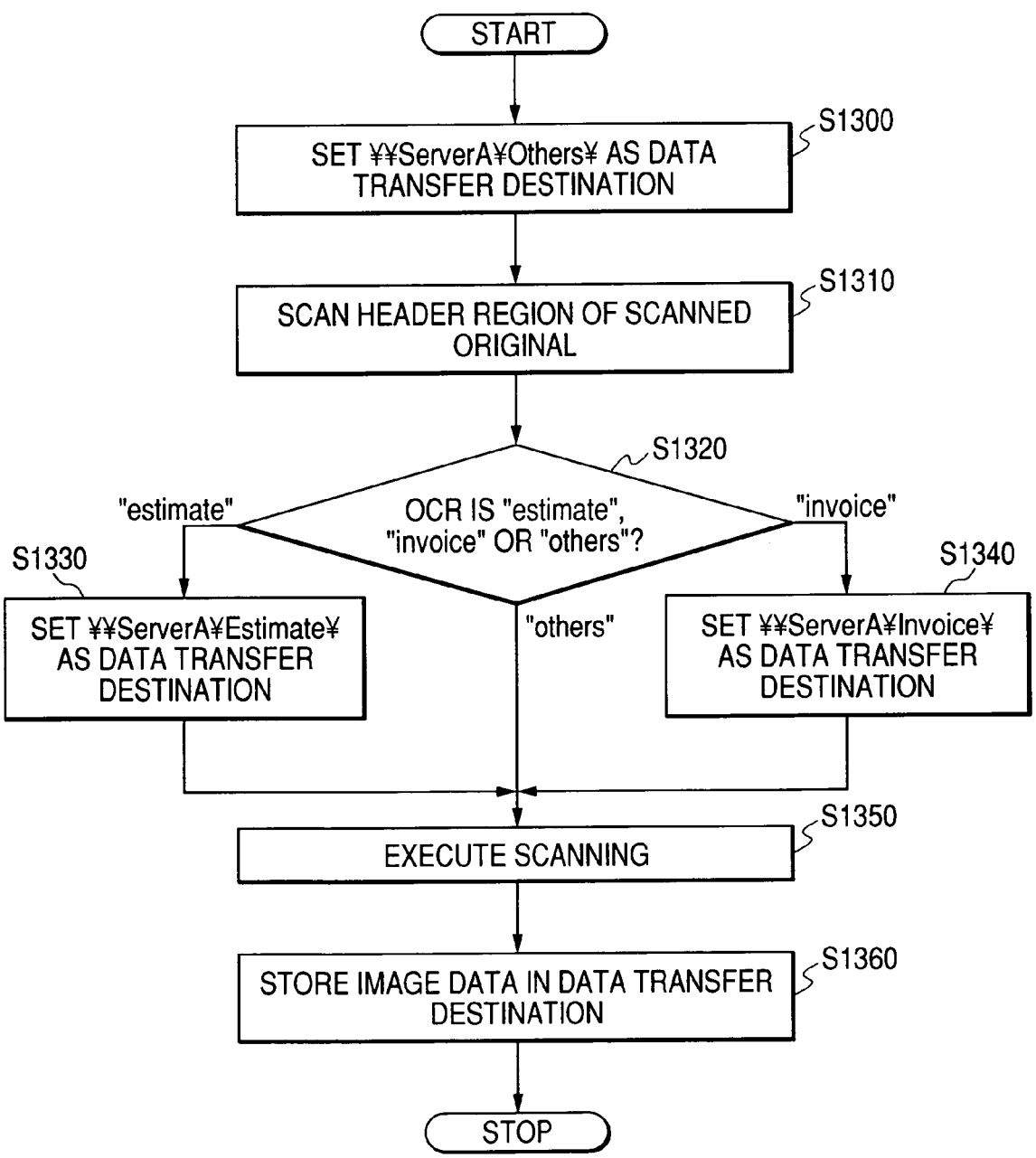
FIG. 11 is a flow chart showing a customized processing for executing the server scanning.

As mentioned above, child nodes on the left side in relation to the root element of the read DOM tree are sequentially retrieved, in a prioritized manner, and processing is performed in accordance with the element (the element "data transfer destination") whose processing specifics are set. The set document is scanned to thus acquire image data, and the thus-acquired image data are stored in the set data transfer destination. FIG. 11 is a descriptive view showing, in the form of a flowchart, server scanning based on the process rule of the embodiment. Specifically, "¥¥ServeA¥Others¥ is set as the data transfer destination (step S1300), and a predetermined header region of the document is tentatively scanned, to thus identify a character string (steps S1310 to S1320). In a case where the identified character string is "estimate," the data transfer destination is changed to "¥¥ServerA¥Estimate¥" (step S1330). In a case where the identified character string is "invoice," the data transfer destination is changed to "¥¥ServerA¥Invoice¥" (step S1340). The document is scanned and captured as image data, and the image data are stored in the set data transfer destination (steps S1350, S1360), and processing is terminated. As mentioned above, server scanning of the image scanner 120 can be customized so as to become processing represented in the flowchart shown in FIG. 11, through use of the process rule setting file.

The image scanner 120 of the thus-described second embodiment downloads, from the file server 160, a process rule setting file in which a process rule is described through use of XML, and the thus-downloaded file is analyzed. Further, a result of analysis (DOM tree) is stored in the RAM 123, and server scanning can be performed on the basis of the thus-stored analysis result. Specifically, since server scanning is carried out in compliance with the process rule described in the process rule setting file, the user can readily customize specifics of processing of the image scanner 120 by keeping, in the file server 160, the process rule setting file in which a desired process rule is described. A process rule is set in the process rule setting file by describing an element whose condition is determined (element "conditional processing") and an element (element "data transfer destinations" or the like) whose processing specifics are determined. In comparison with a case where a process rule is set through use of an exclusive screen, complicated conditions or procedures for carrying out processing specifics can be set. Namely, processing specifics can be customized more flexibly.

In the image scanner 120 of the second embodiment, the process rule setting file is taken as an XML document described through use of XML. However, the essential requirement is to set a process rule through use of the element for setting a condition and an element for determining processing specifics. Another language may also be used.

In the image scanner 120 of the second embodiment, the process rule setting file is downloaded from the file server 160. However, the essential requirement is to be able to acquire a process rule setting file, and there is no necessity for downloading the process rule setting file from a computer, such as the file server 160, connected to the LAN 135. Although the result of analysis of a process rule setting file is stored in the RAM 123, any location may be employed for storage. For instance, the analysis result may be stored in the EEPOM 124. Moreover, the process rule setting file may be stored in the RAM 123 or the EEPOM 124. When server scanning is carried out, the process rule setting file may be analyzed and used.

The image scanner 120 of the second embodiment stores the result of analysis of the process rule setting file as a DOM tree. The essential requirement is to interpret a process rule by the firmware 130 of the image scanner 120. Therefore, the result analysis may be stored in a format other than the DOM tree.

The image scanner 120 of the second embodiment is described to perform processing based on the result of analysis of the process rule setting file through server scanning for storing the image data acquired through scanning into a predetermined storage destination. However, the essential requirement is that processing belongs to the image scanner 120. When processing other than server scanning is performed, processing based on the result of analysis of the process rule setting file may be performed.

Although, in connection with the image scanner 120 of the second embodiment, conditions under which an "estimate" and an "invoice" are identified in the image data pertaining to the header region of the document are illustrated, it goes without saying that specifics of processing of another type may be used as conditions for the process rule.

In connection with the image scanner 120 of the second embodiment, processing for setting a transfer destination of image data is illustrated. As a matter of course, various other types of processing may be used as processing for a process rule.

In connection with the image scanner 120 of the second embodiment, the process rule setting file shown in FIG. 8 has been described as a specific embodiment. However, it goes without saying that designations and meanings of the elements are not limited to the specific embodiment. For instance, an element other than the element "conditional processing" may be used as an element for defining conditions.

In the second embodiment, the network device of the present invention, which operates on the basis of the result of analysis of the process rule setting file, has been described as the image scanner 120. However, the present invention may be taken as a mode of a method for controlling such a network device.

Figure 12:
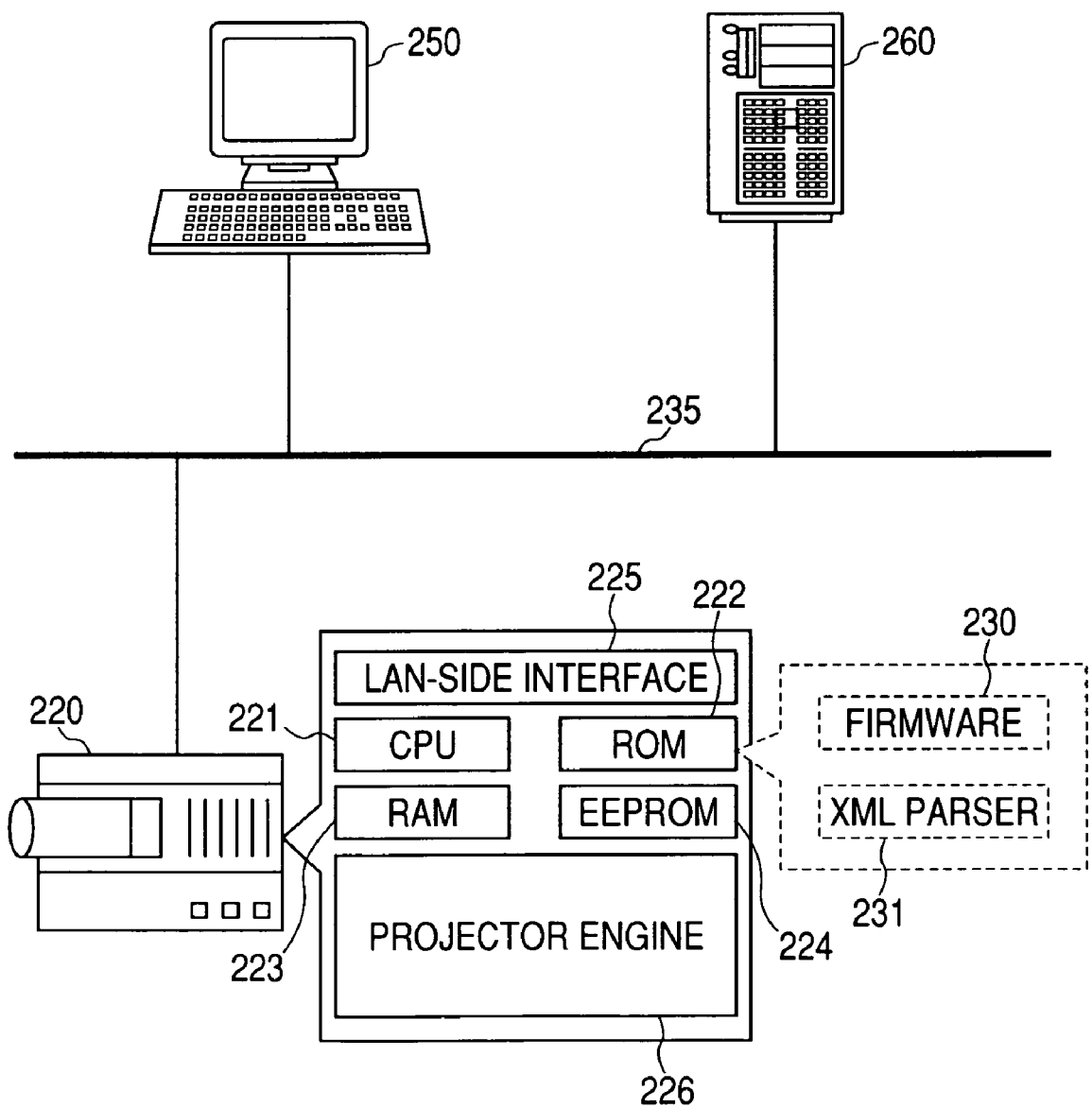
FIG. 12 is a diagram showing a system configuration including a projector according to a third embodiment of the invention.

FIG. 12 is a diagram showing a system configuration including a projector 220 which serves as a network device according to a third embodiment of the invention. The projector 220 comprises a CPU 221 for controlling the entire device; a ROM 222 for storing various types of programs; a RAM 223 for temporarily storing data; an EEPOM 224 for storing data in a nonvolatile manner; and a projector engine 226 for implementing a scanner function. The projector 220 is connected to a LAN 235 by way of a LAN-side interface 225, and acts as a liquid-crystal projector which projects an image on a screen, or the like, in response to a request from a client terminal 250. Firmware 230 used for controlling operation of the entire device and an XML parser 231 which analyzes an XML document are stored in the ROM 222 of the projector 220. The LAN 235 is connected to a file server 260 serving as a general-purpose computer, and information stored in an unillustrated hard disk drive of the file server 160 can be shared by way of the LAN 235.

Figure 14:
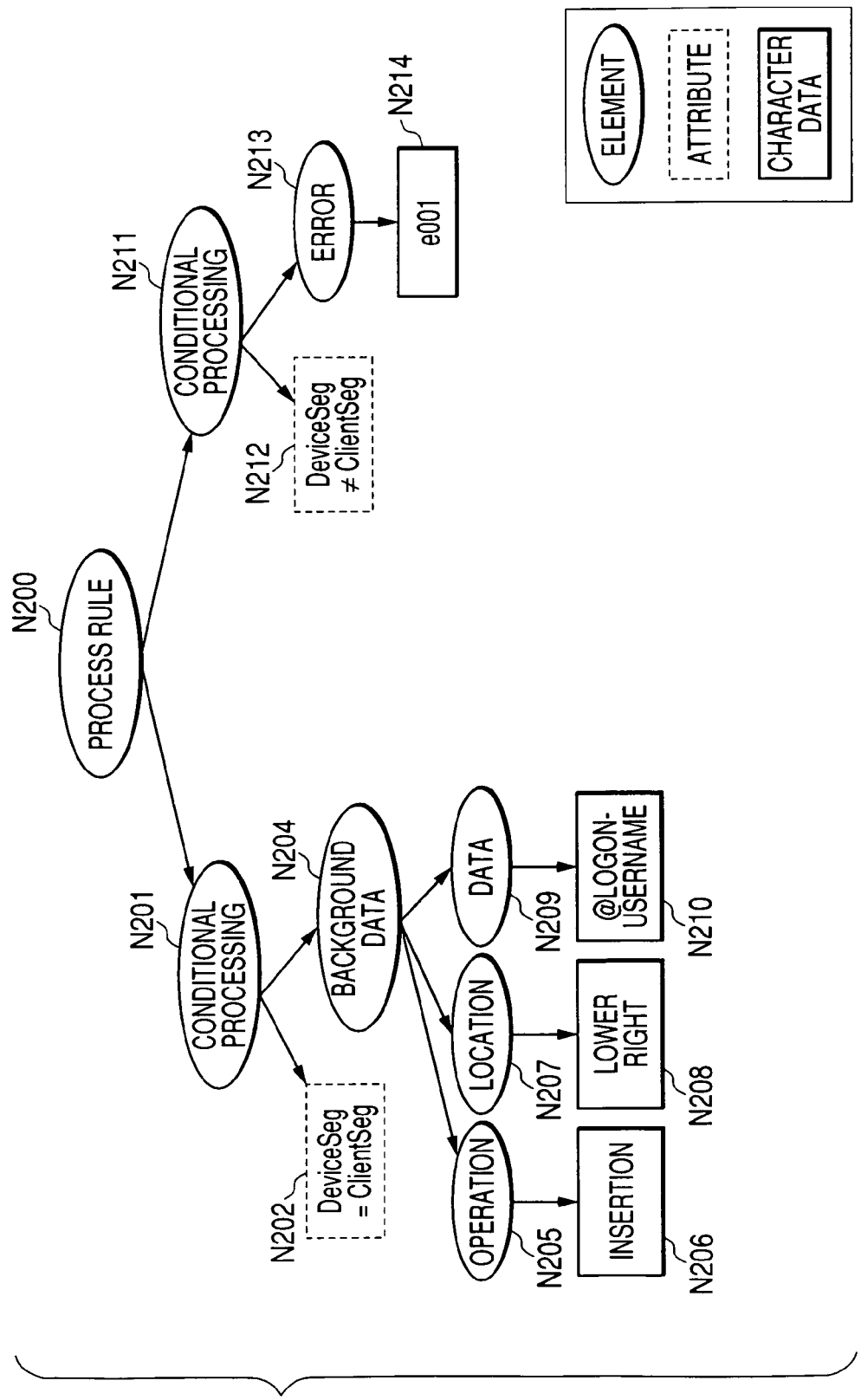
FIG. 14 is a diagram showing a DOM tree used in the third embodiment.

Operation of the thus-configured projector 220 will now be described. Particularly, operation performed at the time of customization of specifics of processing of the projector 220 will be described. As in the case of the print server 20 of the first embodiment and the image scanner 120 of the second embodiment, the projector 220 of the third embodiment performs, at a predetermined timing, the process rule setting file receipt processing illustrated in FIG. 2. Specifically, a process rule setting file in which a process rule of the projector 220 is set is downloaded from the file server 260 (step S100), and the thus-downloaded process rule setting file is analyzed through use of the XML parser 231 and stored in the RAM 223 (steps S110, S120). FIG. 13 is a descriptive view showing an example of the process rule setting file of the third embodiment, and FIG. 14 is a descriptive view conceptually showing a DOM tree obtained as a result of analysis of the process rule setting file shown in FIG. 13. As in the case of the first and second embodiments, the process rule setting file is an XML document described through use of XML, which is employed as a markup language. The process rule of the print server 220 is described through use of the "elements," the "character string data," and the "attribute" in the XML document. Specific details of the process rule will be described later.

Figure 15:
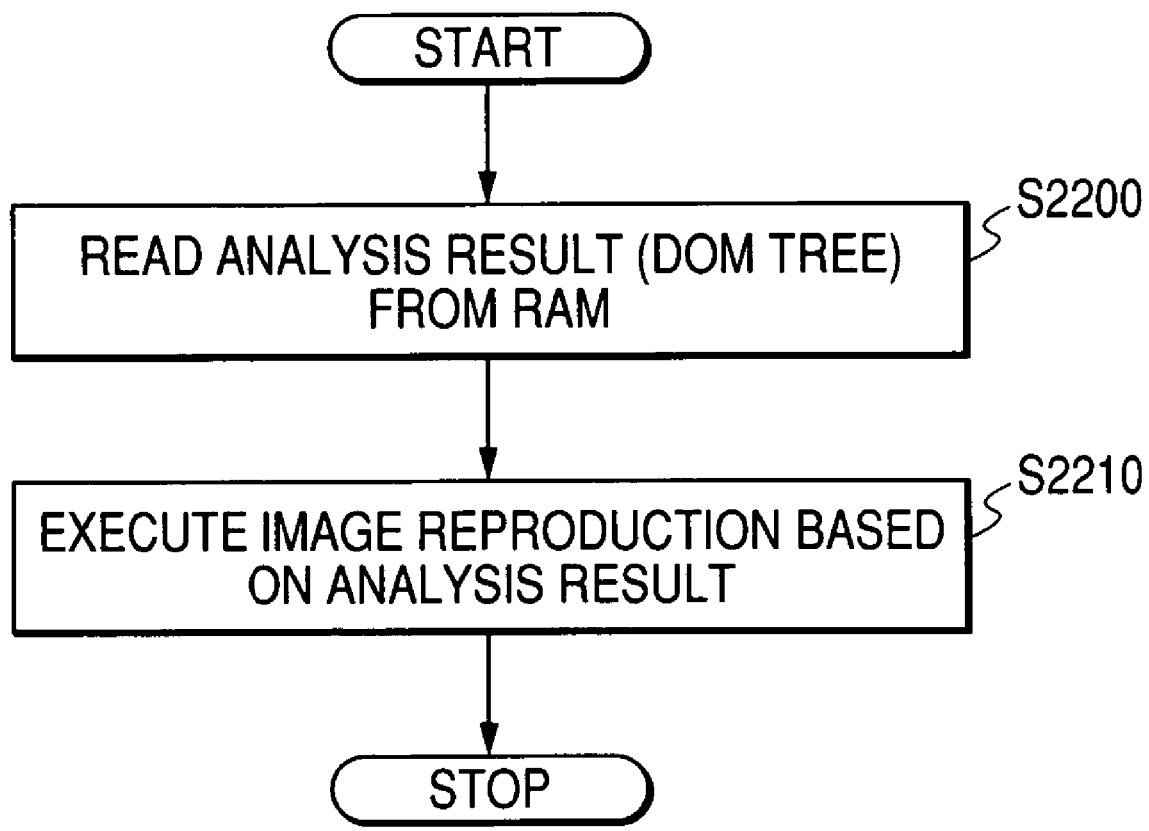
FIG. 15 is a flow chart showing a processing for reproducing an image which is performed by the projector.

Next, operation of the projector 220 based on the result of analysis of the process rule setting file will be described. FIG. 15 is a descriptive view showing an example of image reproduction processing to be performed by the CPU 221 of the projector 220 through use of the firmware 230. This processing is performed when a command for image reproduction is issued by the client terminal 250. As illustrated, in the image reproduction processing, the result of analysis of the process rule setting file (DOM tree) stored in the RAM 223 is read (step S2200). There is performed image reproduction processing, wherein a specified image is reproduced (projected on a screen) on the basis of the thus-read analysis result (step S2210), and processing is completed. The image reproduction processing based on the result of analysis of the process rule setting file is performed by sequentially retrieving (depth-prioritized retrieval), in a prioritized manner, and referring to child nodes on the left side in relation to the root element corresponding to the root of the read DOM tree; and executing processing corresponding to attributes and specifics (character string data) of the referred nodes. The image reproduction processing based on the result of analysis of the process rule setting file will be described through use of the DOM tree shown in FIG. 14, by taking, as an example, specifics of the process rule described in the process rule setting file shown in FIG. 13.

Of the child nodes of the element "process rule" (N200), which is a root element of the DOM tree shown in FIG. 14, reference is made to the leftmost element "conditional processing" (N201) of the child nodes of the element "process rule." The element "conditional processing" is an element which determines conditions for a process rule, and an attribute of the element is determined as a conditional expression in advance. Here, an attribute "DeviceSeg=ClientSeg" (N202) of the element "conditional processing" (N201) becomes a conditional expression. Here, "DeviceSeg" and "ClientSeg" are determined in advance as variables which can be used in the process rule. The "DeviceSeg" shows a network address of the projector 220, and the "ClientSeg" shows a network address of a source for commanding image reproduction (a client terminal 250 or the like).

When a conditional expression (DeviceSeg=ClientSeg) stands, reference is made to an element "background data" (N204) on the right of the attribute (N202). Of the child nodes of the element "background data" (N204), reference is made to the leftmost element "operation" (N205), and reference is made to character string "insertion" (N206) which is a child node of the element "operation." Similarly, reference is sequentially made to an element "location" (N207), a character string data "lower right" (N208), an element "data" (N209), and character string data "@logon-username" (N210). The element "background data" is determined in advance as an element used for determining processing for updating background data pertaining to an image to be reproduced in accordance with specifics (character string data) of the elements "operation," "location," and "data," all of which are child nodes. Here, processing for adding "@logon-username" to a lower right position in the background data is performed. "@logon-username" is determined in advance as a variable which can be used in the process rule, and shows the logon-username of the source of the image reproduction command.

When reference is made to the element "conditional processing" (N211) on the right of the element "conditional processing" (N201) and when the conditional expression (DeviceSeg≠ClientSeg) which is an attribute (N212), stands, reference is made to the element "error" (N213) on the right of the attribute (N212), and reference is then made to the character string data "e001" (N214) which are a child node.

Here, the element "error" is previously set as an element used for determining error processing through which contents of the element (character string data) are determined as an error code. Consequently, error processing of the error code "e001" is performed. As mentioned above, a process rule is described in nodes (N200) to (N214), wherein "the logon-username of the source of image reproduction command is added to a lower right position in the background data when the network address of the projector 220 and the network address of the source of the image reproduction command coincide with each other, and error processing of the error code "e001" is performed when the network address of the projector 220 and the network address of the source of the image reproduction command differ from each other.

Figure 16:
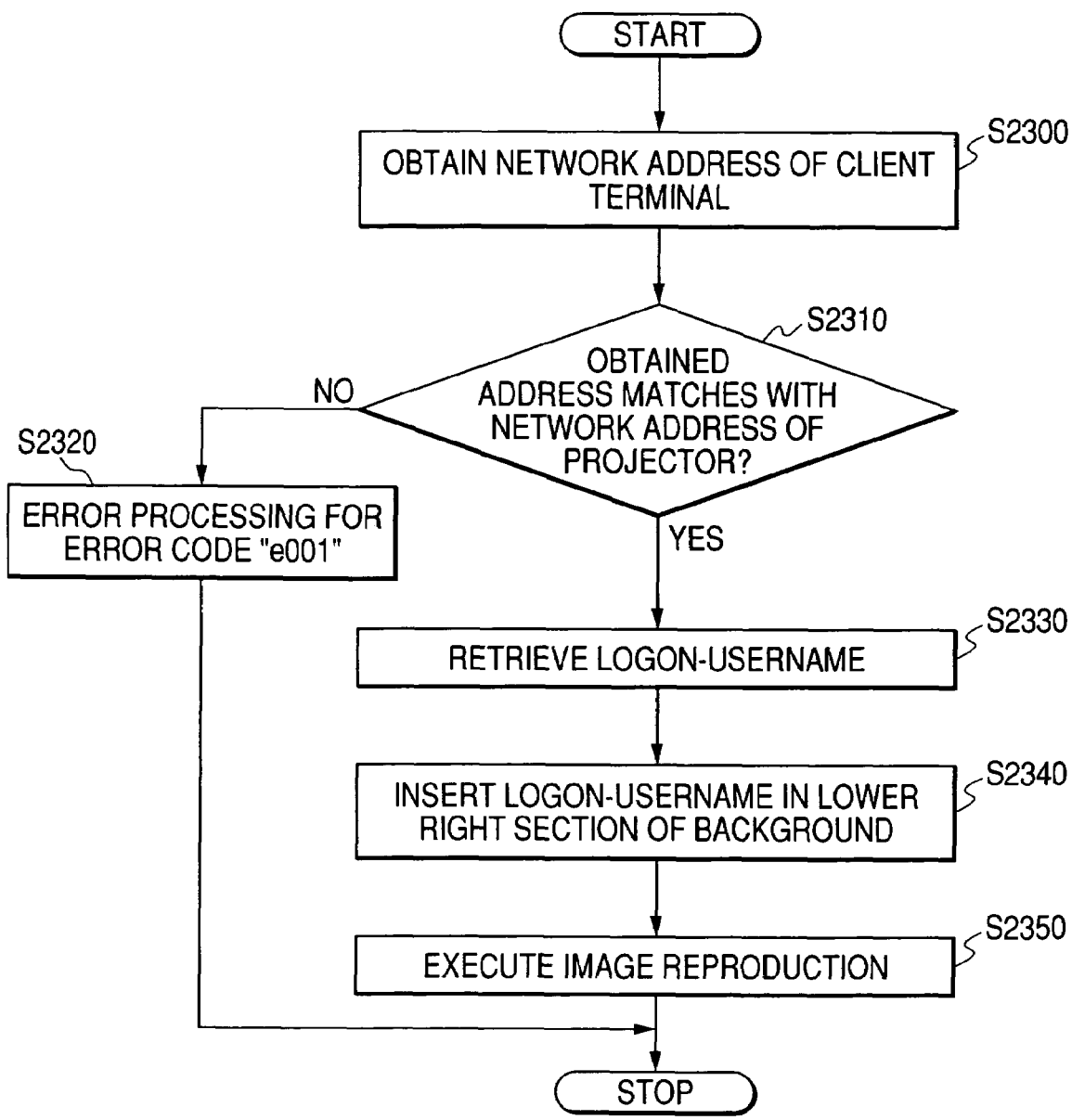
FIG. 16 is a flow chart showing a customized processing for reproducing the image.

As mentioned above, child nodes on the left side in relation to the root element of the read DOM tree are sequentially retrieved, in a prioritized manner, and processing is performed in accordance with specifics of an element (element "conditional processing") whose conditions are determined and specifics of elements (elements "background data" and "error") whose processing specifics are determined, thereby reproducing a specified image. FIG. 16 is a descriptive view showing, in the form of a flowchart, image reproduction processing based on the process rule of the embodiment. Specifically, the network address of the source (a client terminal 250) of an image reproduction command is acquired, and the thus-acquired network address is compared with the network address of the projector 220 (steps S2300, S2310). When the network addresses do not coincide with each other, error processing of the error code "e001" is performed (step S2320), and processing is terminated. In contrast, when the network address of the source of the command and the network address of the projector 220 coincide with each other, the logon-username of the source of the image reproduction command is retrieved, and the image is reproduced by adding the logon-username to the lower right position in the background data (steps S2330 to S2350), and processing is terminated. As mentioned above, the image reproduction processing of the projector 220 can be customized so as to become the processing represented by the flowchart shown in FIG. 16, by use of the process rule setting file.

The projector 220 of the third embodiment downloads, from the file server 260, a process rule setting file in which a process rule is described through use of an XML, and analyzes the thus downloaded file. Further, the projector stores a result of analysis (DOM tree) in the RAM 223, and can perform image reproduction processing on the basis of the thus-stored analysis result. Specifically, since image reproduction processing is carried out in compliance with the process rule described in the process rule setting file, the user can readily customize specifics of processing of the projector 220 by keeping, in the file server 260, the process rule setting file in which a desired process rule is described. In the process rule setting file, the element (the element "conditional processing") whose conditions are set and an element (the element "background data") whose processing specifics are set are described by use of a hierarchical structure (a tree structure). Hence, in comparison with a case where the process rule is set through use of an exclusive screen, setting of complicate conditions or setting of procedures for carrying out processing can be performed. Specifically, processing specifics can be customized more flexibly.

In the projector 220 of the third embodiment, the process rule setting file is taken as an XML document described through use of XML. However, the essential requirement is to set a process rule through use of the element for setting a condition and an element for determining processing specifics. Another language may also be used.

In the projector 220 of the third embodiment, the process rule setting file is downloaded from the file server 260. However, the essential requirement is to be able to acquire a process rule setting file, and there is no necessity for downloading the process rule setting file from a computer, such as the file server 260, connected to the LAN 235. Although the result of analysis of a process rule setting file is stored in the RAM 223, any location may be employed for storage. For instance, the analysis result may be stored in the EEPOM 224. Moreover, the process rule setting file may be stored in the RAM 223 or the EEPOM 224. When image reproduction processing is carried out, the process rule setting file may be analyzed and used.

The projector 220 of the third embodiment stores the result of analysis of the process rule setting file as a DOM tree. The essential requirement is to interpret a process rule by the firmware 230 of the projector 220. Therefore, the result analysis may be stored in a format other than the DOM tree.

The projector 220 of the second embodiment is described to perform processing based on the result of analysis of the process rule setting file through server scanning for storing into a predetermined storage destination the image data acquired through scanning. However, the essential requirement is that processing pertains to the projector 220. When processing other than server scanning is performed, processing based on the result of analysis of the process rule setting file may be performed.

The projector 220 of the third embodiment is illustrated under conditions of the network address of the command source and the network address of the projector 220 coinciding with each other and conditions of the network addresses differing from each other. However, network identification information (e.g., a domain name) other than the network addresses may be used. As a matter of course, various other conditions may be used as conditions for the process rule.

In connection with the projector 220 of the third embodiment, processing for updating background data of an image to be reproduced and error processing are illustrated as processing of the process rule. However, as a matter of course, various other types of processing may be used.

In connection with the projector 220 of the third embodiment, the process rule setting file shown in FIG. 13 has been described as a specific embodiment. However, it goes without saying that designations and meanings of the elements are not limited to the specific embodiment. For instance, an element other than the element "conditional processing" may be used as an element for defining conditions.

In the third embodiment, the network device of the present invention, which operate on the basis of the result of analysis of the process rule setting file, has been described as the projector 220. However, the present invention may be taken as a mode of a method for controlling such a network device.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A network device adapted to be connected to a network, comprising:
  a storage;
  a document acquirer, operable to acquire a structured document in which a rule of processing executed by the network device is described by at least one first element defining at least one condition and at least one second element defining at least one content of the processing that is executed by the network device;
  a document analyzer, operable to analyze the structured document to obtain an analysis result and to store the analysis result in the storage; and
  an operation controller, operable to control an operation of the network device in accordance with the analysis result stored in the storage,
  wherein:
  the first element and the second element are described with a tree structure; and
  the operation controller controls the operation so as to execute processing defined by one of the at least one second element which satisfies one of the at least one condition which is closer to a root of the tree structure.

2. The network device as set forth in claim 1, wherein the structured document is described with a markup language.

3. The network device as set forth in claim 1, wherein the operation controller controls the operation so as to execute the processing in accordance with an order defined by a description order in the structured document.

4. The network device as set forth in claim 1, wherein the document acquirer acquires the structured document from a computer connected to the network.

5. The network device as set forth in claim 1, wherein:
  the network device is configured to be operated in accordance with a command issued from a client terminal connected to the network; and
  the at least one condition includes a condition which is established when an identifier for the client terminal matches with a prescribed identifier.

6. The network device as set forth in claim 5, wherein the identifier is a network identifier.

7. The network device as set forth in claim 1, wherein the at least one content of processing includes processing for disabling the operation.

8. The network device as set forth in claim 1, wherein the network device is a print server operable to cause at least one printer communicatively connected to the print server to execute printing of print data which is received from a client terminal connected to the network.

9. The network device as set forth in claim 8, wherein the at least one content of processing includes processing for updating a code contained in the print data for controlling the at least one printer.

10. The network device as set forth in claim 1, wherein the network device is an image scanner operable to scan an original to generate image data corresponding to the original.

11. The network device as set forth in claim 10, wherein the at least one content of processing includes processing for storing the image data in a prescribed location in the network.

12. The network device as set forth in claim 10, wherein the at least one condition includes a condition which is established when a prescribed character is recognized in a prescribed region in the original.

13. The network device as set forth in claim 1, wherein the network device is a projector operable to project an image in accordance with a command issued from a client terminal connected to the network.

14. The network device as set forth in claim 13, wherein the at least one content of processing includes processing for insert an identifier for the client terminal in a prescribed location of a background of the image.

15. A method of controlling a network device provided with a storage and adapted to be connected to a network, comprising:
  acquiring a structured document in which a rule of processing executed by the network device is described by at least one first element defining at least one condition and at least one second element defining at least one content of the processing that is executed by the network device, wherein the first element and the second element are described with a tree structure;
  analyzing the structured document to obtain an analysis result and to store the analysis result in the storage; and
  controlling an operation of the network device in accordance with the analysis result stored in the storage so as to execute processing defined by one of the at least one second element which satisfies one of the at least one condition which is closer to a root of the tree structure.

16. A computer-readable medium having stored thereon a program causing a computer to execute the method as set forth in claim 15.

* * * * *